United States Patent
Gopalakrishnan et al.

(10) Patent No.: US 6,507,901 B1
(45) Date of Patent: Jan. 14, 2003

(54) ALLOCATING STORAGE FOR ALIGNED DATA

(75) Inventors: Ramachandran Gopalakrishnan, Bangalore (IN); Bhashyam Ramesh, San Diego, CA (US)

(73) Assignee: NCR Corporation, Dayton, OH (US)

( * ) Notice: Subject to any disclaimer, the term of this patent is extended or adjusted under 35 U.S.C. 154(b) by 26 days.

(21) Appl. No.: 09/816,283

(22) Filed: Mar. 23, 2001

(51) Int. Cl.⁷ .............................................. G06F 12/00
(52) U.S. Cl. ....................... 711/170; 711/171; 707/100; 707/102
(58) Field of Search ................................ 711/200, 170, 711/171, 221; 717/106, 140, 141, 151, 159; 707/100, 102

(56) References Cited

U.S. PATENT DOCUMENTS 6,295,561 B1 * 9/2001 Nagy ........................ 717/140
6,366,931 B1 * 4/2002 Borowsky et al. .......... 707/200

* cited by examiner

Primary Examiner—Do Hyun Yoo
Assistant Examiner—Yamir Encarnacion
(74) Attorney, Agent, or Firm—Baker Botts LLP

(57) ABSTRACT

A method and computer program for allocating storage for a header and one or more data elements in a data storage facility are disclosed. The method and computer program include computing a hole size B that is a portion of a word that would be unallocated if storage were allocated to the header and to the data elements in a preferred order. The method and computer program include finding a subset of data elements $S=\{F_{i1}, F_{i2}, \ldots, F_{in}\}$ that satisfy the equation $(\text{SizeModN}(F_{i1})+\text{SizeModN}(F_{i2})+ \ldots +\text{SizeModN}(F_{in}))$ mod $N=B$ where N is the largest alignment requirement associated with any data element. The method and computer program include allocating storage to data elements in S first and allocating storage to the remaining elements in the preferred order. A lookup table and a method for building the lookup table are also disclosed.

19 Claims, 5 Drawing Sheets

ALLOCATING STORAGE FOR ALIGNED DATA

BACKGROUND

As computer software developers develop software for 64-bit processors, data alignment in data storage, such as a disk, will become extremely important. "Alignment" in the data storage context refers to limitations placed on the address of a data object in the data storage. For example, a common "alignment requirement" is that the address of a data object must be a multiple of a power of 2, i.e. $2^N$, which means that the least significant N digits of the address must be zero.

Alignment is important for functional reasons because an unaligned data access may cause a bus error resulting in a system crash. Alignment is also important for performance reasons because unaligned data access, which can be handled with hardware or software alignment correction tools, will likely become more expensive as processor speeds continue to increase.

Data stored in a data storage is typically heterogeneous, in the sense that it consists of elements with varying alignment requirements. It is easy to optimize the storage space allocated for the data, in the absence of alignment requirements, by simply packing the elements one after another. However, imposing alignment requirements on the data elements may force the introduction of padding to fill holes in storage caused by the alignment requirements. This padding may increase the amount of storage required to store the data elements. The amount of storage required to store the data elements may depend on the order in which the data elements are arranged in storage. This is because the padding necessary to accommodate the data alignment requirements may be different depending on the order that the data elements are stored.

SUMMARY

In general, in one aspect, the invention features a method for allocating storage for a header and one or more data elements in a data storage facility. The data storage facility is divided into words. Each word includes one or more incidents of one or more types of alignment boundaries. Each incident of a type of alignment boundary falls on a multiple of a base amount of units from the beginning of the word. The base amount is unique for each type of alignment boundary. Each data element is required to satisfy an alignment requirement, which is the size of alignment boundary with which it is required to align. Each data element has a length that is a multiple of its alignment requirement. The method includes computing a hole size, B, that is a portion of a word that would be unallocated if storage were allocated to the header and to the data elements in a preferred order. The method further includes finding a subset of data elements $S=\{F_{i1}, F_{i2}, \ldots, F_{in}\}$ that satisfy the following equation:

$$(\text{SizeMod}N(F_{i1})+\text{SizeMod}N(F_{i2})+ \ldots +\text{SizeMod}N(F_{in}))\bmod N=B$$

where SizeModN(F) is the size of F modulo N, and N is the largest alignment requirement associated with any data element. The method further includes allocating storage to data elements in S first and allocating storage to the remaining data elements in the preferred order.

Implementations of the invention may include one or more of the following. Finding the subset of data elements S may include accessing a lookup table using N and B as indexes to retrieve a first set of one or more modulo values $M_{1,1 \ldots R}$ and a frequency $F_{1,1 \ldots R}$ for each modulo value. Finding the subset of data elements S may further include searching for a subset $T=\{A_{i1}, A_{i2}, \ldots, A_{in}\}$ of data elements, such that for every p from 1 to R there is a set of $F_{1,p}$ data elements such that the size of those data elements modulo N is $M_{1,p}$, and setting S=T. Finding the subset of data elements S may further include, if the search for a subset T of data elements fails using the first set of one or more modulo values $M_{1,1 \ldots R}$ and the frequency $F_{1,1 \ldots R}$ for each modulo value, accessing the lookup table again using N and B as indexes to retrieve a second set of one or more modulo values $M_{2,1 \ldots R}$ and a frequency $F_{2,1 \ldots R}$ for each modulo value and searching for a subset T using $M_{2,1 \ldots R}$ and a frequency $F_{2,1 \ldots R}$. The method may then set S=T. Finding the subset of data elements S may further include, if the search for a subset T of data elements fails, setting B=B−1 and repeating the search.

In general, in another aspect, the invention features a lookup table useful in allocating storage for a header and one or more data elements in a data storage facility. The data storage facility is divided into words. Each word includes one or more incidents of one or more types of alignment boundaries. Each incident of a type of alignment boundary falls on a multiple of a base amount of units from the beginning of the word. The base amount is unique for each type of alignment boundary. Each data element is required to satisfy an alignment requirement, which is the size of alignment boundary with which it is required to align. Each data element has a length that is a multiple of its alignment requirement. The lookup table includes a plurality of solution data objects, each of which includes one or more data element modulus objects $D_{1 \ldots n}$, each data item modulus object containing a data item size modulo the largest alignment requirement associated with any data element. Each of the plurality of solution data objects further includes a frequency object $F_{1 \ldots n}$ for each respective data item modulus object. Each frequency object contains the number of respective data elements required, in combination with the other data elements identified by the data element modulus objects to satisfy the following equation:

$$(F_1 \cdot D_1 + F_2 \cdot D_2 + \ldots + F_n \cdot D_n) \bmod N = B$$

where B is the size of a portion of a word that would be unallocated if storage were allocated to the header and to the data elements in a preferred order, and N is the largest alignment requirement associated with a data element.

Implementations of the invention may include one or more of the following. Each solution data object may include a count data object that contains the number of data element modulus objects in the respective solution data object. The solution data objects may be grouped into hole size data objects, where each hole size object is associated with a selected value of B. The hole size objects may be grouped into alignment data objects, where each alignment object is associated with a selected largest alignment requirement.

In general, in another aspect, the invention features a method for building a lookup table for allocating storage for a header and one or more data elements in a data storage facility. The data storage facility is divided into words. Each word includes one or more incidents of one or more types of alignment boundaries. Each incident of a type of alignment boundary falls on a multiple of a base amount of units from the beginning of the word. The base amount is unique for each type of alignment boundary. Each data element is required to satisfy an alignment requirement, which is the size of alignment boundary with which it is required to align. Each data element has a length that is a multiple of its alignment requirement. The method includes for s from 1 to t, performing the following for selected s-tuples $(x_1, x_2, \ldots x_s)$ and for B ranging from 1 to p find the smallest frequencies $(f_1, f_2, \ldots f_s)$ such that $$(x_1 \cdot f_1 + x_2 \cdot f_2 + \ldots + x_s \cdot f_s) \bmod N = B.$$

where N is the largest alignment requirement associated with a data element, t is an upper limit on the number of distinct elements in a valid solution, and p is N−1.

Implementations of the invention may include one or more of the following. t may be 3 and p may be 7. The method may further include storing the s-tuples and respective frequencies in the lookup table indexed by B. The sum of two or more elements of each selected s-tuple may not equal $2^t$ or a multiple of $2^t$. The selected 3-tuples when t is 3 may include: (1,2,3), (1,2,4), (1,3,6), (1,4,5), (1,4,6), (1,5,6), (2,3,4), (2,3,7), (2,4,5), (2,4,7), (2,5,7), (3,4,6), (3,4,7), (4,5,6), (4,6,7), and (5,6,7). The selected 2-tuples when t is 3 may include: (1,2), (1,3), (1,4), (1,5), (1,6), (2,3), (2,4), (2,5), (2,7), (3,4), (3,6), (3,7), (4,5), (4,6), (4,7), (5,6), (5,7), and (6,7). The selected 1-tuple when t is 3 may include: 1, 2, 3, 4, 5, 6, and 7.

In general, in another aspect, the invention features a computer program, stored on a tangible storage medium, for use in allocating storage for a header and one or more data elements in a data storage facility. The data storage facility is divided into words. Each word includes one or more incidents of one or more types of alignment boundaries. Each incident of a type of alignment boundary falls on a multiple of a base amount of units from the beginning of the word. The base amount is unique for each type of alignment boundary. Each data element is required to satisfy an alignment requirement, which is the size of alignment boundary with which it is required to align. Each data element has a length that is a multiple of its alignment requirement. The program includes executable instructions that cause a computer to compute a hole size, B, that is a portion of a word that would be unallocated if storage were allocated to the header and to the data elements in a preferred order. The program further includes executable instructions that cause the computer to find a subset of data elements $S=\{F_{i1}, F_{i2}, \ldots, F_{in}\}$ that satisfy the following equation:

$$(\text{SizeMod}N(F_{i1}) + \text{SizeMod}N(F_{i2}) + \ldots + \text{SizeMod}N(F_{in})) \bmod N = B$$

where SizeModN(F) is the size of F modulo N, and N is the largest alignment requirement associated with a data element. The program further includes executable instructions that cause the computer to allocate storage to data elements in S first; and allocate storage to the remaining data elements in the preferred order.

Implementations of the invention may include one or more of the following. In finding the subset of data elements S, the computer may access a lookup table using N and B as indexes to retrieve a first set of one or more modulo values $M_{1,1 \ldots R}$ and a frequency $F_{1,1 \ldots R}$ for each modulo value, search for a subset $T=\{A_{i1}, A_{i2}, \ldots, A_{in}\}$ of data elements such that for every p from 1 to R there is a set of $F_{1,p}$ data elements such that the size of those data elements modulo N is $M_{1,p}$, and set S=T. In finding the subset of data elements S, if the search for a subset T of data elements fails using the first set of one or more modulo values $M_{1,1 \ldots R}$ and the frequency $F_{1,1 \ldots R}$ for each modulo value, the computer may access the lookup table again using N and B as indexes to retrieve a second set of one or more modulo values $M_{2,1 \ldots R}$ and a frequency $F_{2,1 \ldots R}$ for each modulo value, search for subset T using $M_{2,1 \ldots R}$ and a frequency $F_{2,1 \ldots R}$, and set S=T. If the search for a subset T of data elements fails, the computer may set B=B−1 and repeat the search.

DETAILED DESCRIPTION

Figure 1:
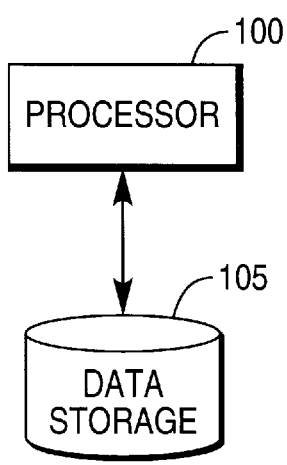
FIG. 1 is a block diagram of a computer system including a processor and a data storage facility.

An algorithm for allocating storage for aligned data executes on a processor 100, as illustrated in FIG. 1. The processor can store data on and retrieve data from a storage facility 105, which can be a sequential access device, such as a disk drive, or a random access device, such as random access memory (RAM).

Figure 2:
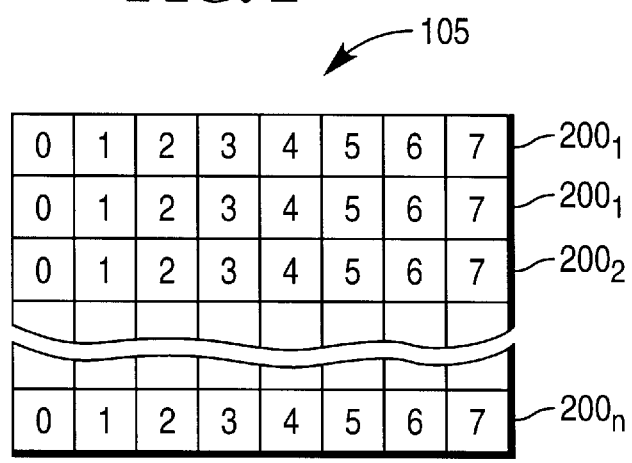
FIG. 2 is a representation of the arrangement of data in the data storage facility.
Figure 3:
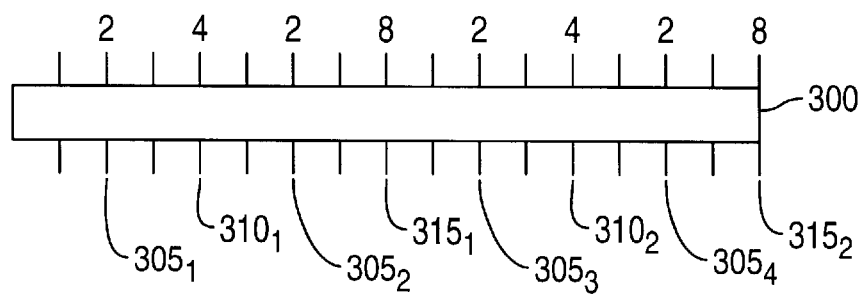
FIG. 3 illustrates types of alignment boundaries in a word in the data storage facility.

The data storage facility is divided into words $200_{1 \ldots n}$, as illustrated in FIG. 2. In the example shown in FIG. 2, the words $200_{1 \ldots n}$ consist of eight bytes, or 64 bits. Each word $200_{1 \ldots n}$ includes one or more incidents of one or more types of alignment boundaries, as shown in FIG. 3. FIG. 3 illustrates an example word 300 and three example types 305, 310, 315 of alignment boundaries. The types of alignment boundaries 305, 310, 315 include 2-byte alignment boundaries $305_1, 305_2, 305_3, 305_4$, 4-byte alignment boundaries $310_1, 310_2$, and 8-byte alignment boundaries $315_1, 315_2$. Notice that the 4-byte alignment boundaries $310_1, 310_2$ are also 2-byte alignment boundaries and the 8-byte alignment boundaries $315_1, 315_2$ are also 4-byte alignment boundaries and 2-byte alignment boundaries.

Each incident of a type of alignment boundary falls on a multiple of a base amount of units from the beginning of the word, the base amount being unique for each type of alignment boundary. For example, the 2-byte alignment boundaries fall on a multiple of two bytes from the beginning of the word, the 4-byte alignment boundaries fall on a multiple of four bytes from the beginning of the word, and the 8-byte alignment boundaries fall on a multiple of eight bytes from the beginning of the word.

One example algorithm allocates storage in the data storage facility 105 for a header and one or more data elements called TYPE1 data elements. For this example, the header and the TYPE1 data elements are assumed to have the following characteristics:

Each data element is required to satisfy an alignment requirement, which is the size of alignment boundary with which it is required to align. In one example, a data element may be required to align with a 1-byte alignment boundary, a 2-byte alignment boundary, a 4-byte alignment boundary, or an 8-byte alignment boundary, in which case the alignment requirement would be 1, 2, 4 or 8, respectively. An alignment requirement of 2 is more easily satisfied than, for example, an alignment requirement of 8 because there are more 2-byte alignment boundaries than 8-byte alignment boundaries. An alignment requirement of 8 is larger than an alignment requirement of 4, which is larger than an alignment requirement of 2.

Each data element has a length that is a multiple of its alignment requirement. Thus, a data element with an alignment requirement of N can be N×P bytes long, where P is an integer. For example, a data element with a 4 byte alignment requirement can be 4P (e.g., 4, 8, 16, etc.) bytes long.

Let the size of the header be H, and the maximum alignment requirement for a data element be N.

A very simple approach to aligning the data elements sorts the data elements according to their alignment requirements, and stores them in decreasing order of alignment requirement.

Figure 4:
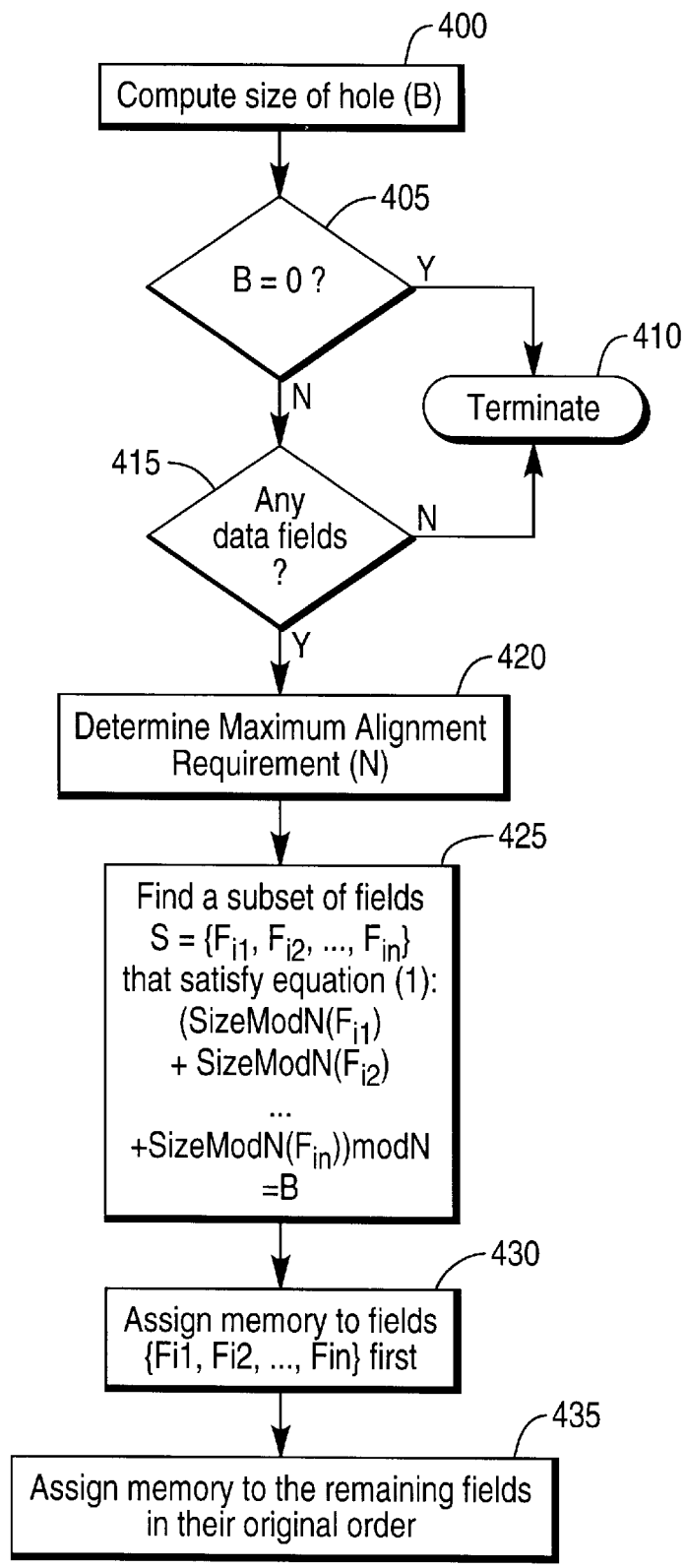
FIG. 4 is a flow chart of a process for allocating storage for aligned data.
Figure 5:
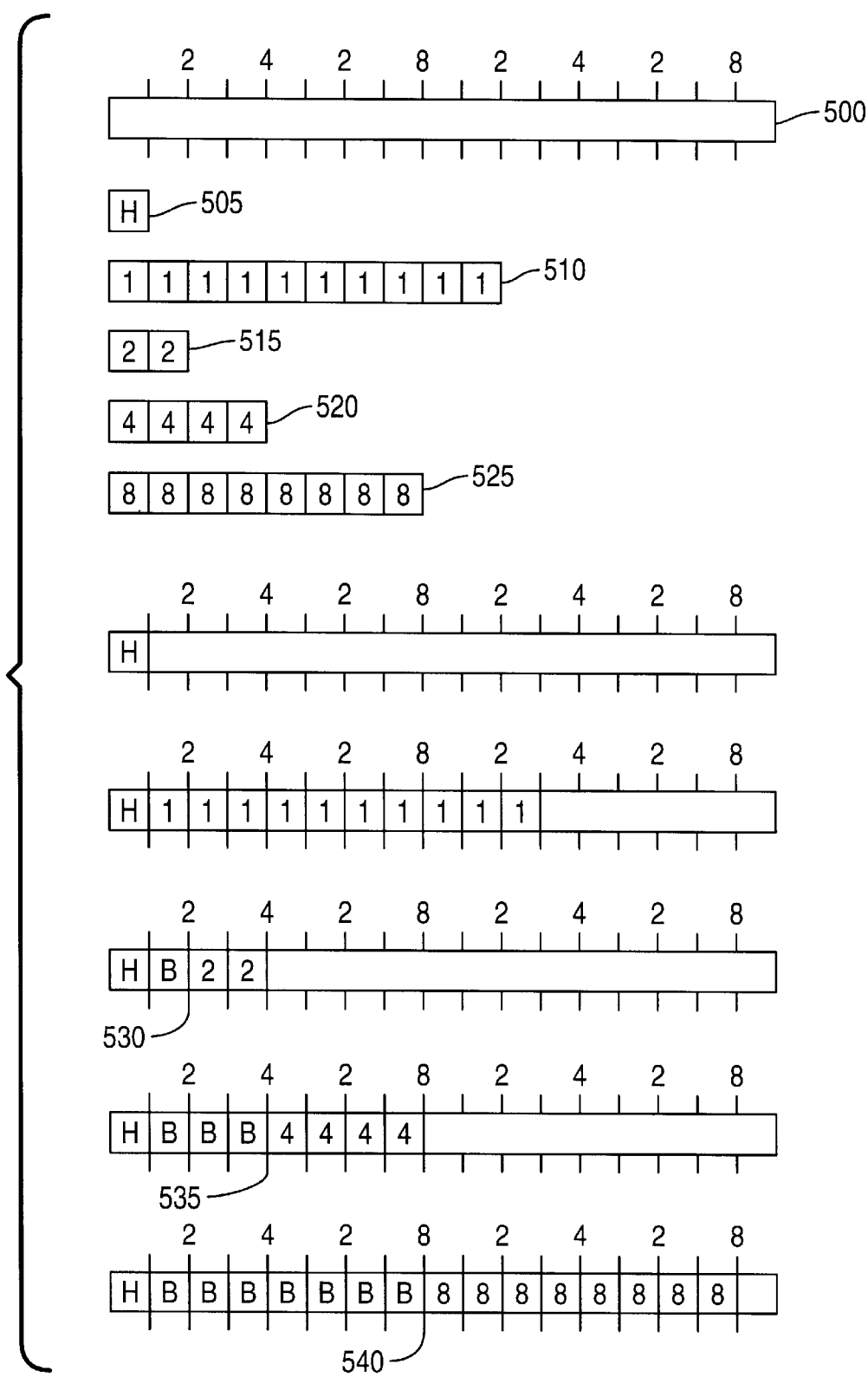
FIG. 5 illustrates the formation of holes in storage caused by storing aligned data.

The example algorithm begins by computing a hole size, B (block 400), that is a portion of a word that would be unallocated if storage were allocated to the header and to the data elements using this simple approach, as shown in FIG. 4. The formation of the hole is illustrated in FIG. 5. In the example shown in FIG. 5, the algorithm is attempting to fill a 16-byte block 500 of storage with a header 505 and one or more data elements. The header is assumed to extend one byte into the block 500 being allocated. The data elements include a 10-byte data element 510 with a alignment requirement of 1, a 2-byte data element 515 with an alignment requirement of 2, a 4-byte data element 520 with an alignment requirement of 4, and an 8-byte data element 525 with an alignment requirement of 8.

As can be seen in FIG. 5, if none of the storage in word 500 is allocated to any data elements, the header will consume the first byte, leaving 15 bytes in the word unallocated. If a portion of the storage is allocated to the data element 510 with the alignment requirement of 1, it can be aligned with the end of the header leaving no hole, meaning that B is zero.

If a portion of the storage is allocated to the data element 515 with the alignment requirement of 2, the data element 515 must align with a 2-byte alignment boundary, e.g. 530, leaving a hole of size B=1 between the header and the data element. Similarly, if a portion of the storage is allocated to the data element 520 with the alignment requirement of 4, the data element 520 must align with a 4-byte alignment boundary, e.g. 535, leaving a hole of size B=3 between the header and the data element. Similarly, if a portion of the storage is allocated to the data element 525 with the alignment requirement of 8, the data element 525 must align with an 8-byte alignment boundary, e.g. 540, leaving a hole of size B=7 between the header and the data element.

A simple approach to aligning the data elements sorts the data elements according to their alignment requirements, and stores them in decreasing order of alignment requirement. B can then be calculated by taking the size of the header modulo the largest alignment requirement of the data elements. In the worst case, where the largest alignment requirement is 8, B can be as high as 7.

The algorithm provides a method for allocating storage to the data elements that is potentially more efficient than the simple approach described above. The algorithm accomplishes this by the following steps (refer back to FIG. 4):

1. Calculate B, as described above. If B is zero, there is no hole (block 405) and there is no allocation problem and the program terminates (block 410).
2. Determine the maximum alignment of a data element in TYPE1 and call it N (block 420). Note that, in this example, N will take one of the four values from the set $\{1, 2, 4, 8\}$.
3. Compute the value of SizeModN for each TYPE1 data element. For a data element F, SizeModN(F) is the (size of F) modulo N.
4. Find a subset of the TYPE1 data elements (hereafter "data elements" refers to TYPE1 data elements, unless otherwise noted) $S=\{F_{i1}, F_{i2}, \ldots, F_{in}\}$ that satisfy the following equation (hereinafter referred to as equation (1)): $(SizeModN(F_{i1})+SizeModN(F_{i2})+ \ldots + SizeModN(F_{in})) \bmod N=B$ (block 425).
5. Allocate storage to data elements in subset S first (block 430) and then to the remaining data elements in their preferred order (block 435).

Identification of a suitable subset of data elements in Step 4 with a brute force method, such as simply trying all combinations of data elements, may take exponential time and is not practical for implementation. An alternative to the brute force method is to pre-compute all possible solutions to equation (1) for various values of N and B. In that case, step 4 above can be replaced by the following steps:

Step 4a: Check whether the set of data elements satisfy one of the pre-computed solutions to equation(1).
If yes, move the data elements to optimize space usage and terminate.
If no, g o to Step 4b.

Step 4b: Set B=B−1.
If B is 0 then terminate (not able to optimize in this case)
else go to Step 4a (try to fill up the next smaller hole size).

A solution to equation (1) can be found in polynomial time using this method if it is possible to compute all possible solutions in polynomial time. The next section will describe key observations that make it possible to compute all possible solutions in polynomial time.

Upper Limit on Number of Data Elements

The first observation will put an upper limit on the number of data elements that need to be considered in order to find a solution.

At the outset, it is not necessary to consider a data element F, for which SizeModN(F)=0, since such a data element does not contribute in any way towards solving equation (1). Further, the hole size, B, will be 0 if the maximum alignment of a fixed length data element, N, is 1.

Instead of finding a subset of data elements that satisfy equation (1), consider the values of the function SizeModN (F), which can be in the range of 0 to (N−1). It is possible to put an upper limit on the number of data elements for which SizeModN is equal to i ($1 \leq i < N$), that must be considered to obtain a solution to equation (1). The upper limits will be computed for N=2, N=4 and N=8. The method to compute the upper limit is shown next.

Let SizeModN(F)=i, $1 \leq i < N$, since i=0 can be ignored. Compute an upper limit M for each i. This may be done by computing the set $$\{i \cdot 1 \bmod N, i \cdot 2 \bmod N, \ldots, i \cdot M \bmod N\}$$

so that $$(i \cdot (M+1)) \bmod N=0, \text{ and } (i \cdot k) \bmod N \neq 0, \text{ for } 1 \leq k \leq M.$$

For example, let N=4 and i=3. The table below shows the values of (i·k) mod N.

TABLE 1

| k | i · k | i · k mod N |
|---|-------|-------------|
| 1 | 3     | 3           |
| 2 | 6     | 2           |
| 3 | 9     | 1           |
| 4 | 12    | 0           |
| 5 | 15    | 3           |
| 6 | 18    | 2           |

It may be observed that M=3, since $(i \cdot k) \bmod N \neq 0$, for $1 \leq k \leq 3$, and $(i \cdot (M+1)) \bmod N = 0$.

The significance of M can be explained in the context of equation (1). Consider a subset of data elements $S=\{F_{i1}, F_{i2}, F_{i3}, F_{i4}, F_{i5}, F_{i6}\}$ that satisfy equation (1) such that SizeModN($F_{i1}$)=3,
SizeModN($F_{i2}$)=3,
SizeModN($F_{i3}$)=3,
SizeModN($F_{i4}$)=3,
SizeModN($F_{i5}$)=3,
SizeModN($F_{i6}$)=2.

Equation (1) can be written as $(3+3+3+3+3+2) \bmod 4 = B$, or $17 \bmod 4 = B$, or $1 = B$.

There are k (=5) data elements for which SizeModN is equal to 3. The contribution of these data elements towards the sum in the left hand side of equation(1) is $(3 \cdot 5) \bmod 4 = (3 \cdot 1) \bmod 4 = 3$.

From the table above, k=1 results in $(3 \cdot 1) \bmod 4 = 3$.

Hence, it is possible to find a smaller subset with only 1 data element, $F_{i1}$, whose contribution to equation (1) will be identical to that of the set $\{F_{i1}, F_{i2}, F_{i3}, F_{i4}, F_{i5}\}$. In this example, a smaller subset that will satisfy equation (1) is $\{F_{i1}, F_{i6}\}$.

The value of (i·k) mod N is a distinct value for all values of $k \leq M$, after which the values simply repeat with a periodicity of (M+1). Hence, when N=4, it is sufficient to consider at most 3 data elements for which SizeModN=3 for inclusion in a solution to satisfy equation (1).

Table 2 below shows the values of M for different values of i and N.

TABLE 2

| N | i | M |
|---|---|---|
| 2 | 1 | 1 |
| 4 | 1 | 3 |
| 4 | 2 | 1 |
| 4 | 3 | 3 |
| 8 | 1 | 7 |
| 8 | 2 | 3 |
| 8 | 3 | 7 |
| 8 | 4 | 1 |
| 8 | 5 | 7 |
| 8 | 6 | 3 |
| 8 | 7 | 7 |

Let $M_{sum,N}$ be the sum of the values of M for a given N.

$N=2 \rightarrow M_{sum,2}=1$.

$N=4 \rightarrow M_{sum,4}=3+1+3=7$.

$N=8 \rightarrow M_{sum,8}=7+3+7+1+7+3+7=35$.

Let the tuple <v,f> denote a set (that allows duplicates) where the element v occurs f times. Define sets $S_2$, $S_4$ and $S_8$ as:

$S_2 = \{\langle 1, 1 \rangle\}$, cardinality($S_2$) = $M_{sum,2}$ = 1.

$S_4 = \{\langle 1, 3 \rangle, \langle 2, 1 \rangle, \langle 3, 3 \rangle\}$, cardinality($S_4$) = $M_{sum,4}$ = 7.

$S_8 = \{\langle 1, 7 \rangle, \langle 2, 3 \rangle, \langle 3, 7 \rangle, \langle 4, 1 \rangle, \langle 5, 7 \rangle, \langle 6, 3 \rangle, \langle 7, 7 \rangle\}$, cardinality($S_8$) = $M_{sum,8}$ = 35.

It is sufficient to consider all the subsets of $S_N$ (N=2, 4, 8) to find all possible solutions for equation (1). It should be clear that $S_N$ contains all possible distinct elements and increasing the frequency of any element will not increase the number of solutions. Hence, the problem has been reduced from computation on all subsets of a set with maximum number of data elements to computation on all subsets of a set with at most 35 elements.

This is still a very expensive operation, since it requires examination of $2^{35}$ subsets. The second key observation, which is described next, will drastically reduce the number of subsets to be examined.

Upper Limit on Number of Distinct Elements

The second observation is relevant for N=4 and N=8. It will put an upper limit on the number of distinct elements, $D_N$, that may be present in a solution for equation (1). It will be shown that any solution that has more than D distinct elements can be reduced or is equivalent to a solution with less than or at most D distinct elements. The result to be shown is that:

$N=4 \rightarrow D_4=2$ $N=8 \rightarrow D_8=3$

Proof:

Case N=4

Consider a subset $Sub_4=\{<1, f_1>, <2, f_2>, <3, f_3>\}$, with 3 (>$D_4$) distinct elements.

From equation (1), $$(1 \cdot f_1 + 2 \cdot f_2 + 3 \cdot f_3) \bmod 4 = B.$$

Assume that $f_1 \leq f_3$ without loss of generality. Hence, $$B = (1 \cdot f_1 + 2 \cdot f_2 + 3 \cdot (f_3 - f_1 + f_1)) \bmod 4 = (2 \cdot f_2 + 4 \cdot f_1 + 3 \cdot (f_3 - f_1)) \bmod 4 = (2^*f_2 + 3^*(f_3 - f_1)) \bmod 4.$$

Hence, an equivalent solution has been found using a smaller set $\{<2,f_2>, <3, f_3-f_1>\}$.

The key observation is that the sum of two of the distinct elements, 1 and 3, is equal to N. This reduction will be possible in general when the sum of two or more distinct elements is equal to N or a multiple of N.

This principle also applies when N=8.

Case N=8

There are 7 distinct elements which may be represented by the set $\{1, 2, 3, 4, 5, 6, 7\}$. Now, 1+7=8, 2+6=8 and 3+5=8. Hence, any subset that contains both 1 and 7 as distinct elements can be reduced to a subset with one less distinct element that contains either 1 or 7, but not both. Similarly, any subset that contains both 2 and 6 as distinct elements can be reduced to a smaller subset that contains either 2 or 6, but not both. Similarly, any set that contains both 3 and 5 as distinct elements can be reduced to a set that contains either 3 or 5, but not both. Thus, the maximum number of distinct elements that need to be considered has been reduced from 7 to 4. The 4 distinct elements will be 1. Either 1 or 7.
2. Either 2 or 6.
3. Either 3 or 5.
4. 4

Hence, there will be 8 subsets with 4 distinct elements:

1. $\{1, 2, 3, 4\}$
2. $\{1, 2, 5, 4\}$
3. $\{1, 6, 3, 4\}$
4. $\{1, 6, 5, 4\}$
5. $\{7, 2, 3, 4\}$
6. $\{7, 2, 5, 4\}$
7. $\{7, 6, 3, 4\}$
8. $\{7, 6, 5, 4\}$

In each case, it is quite easy to verify that there is one combination that adds up to 8 or 16. The combination that adds up to 8 or 16 is shown in bold above.

Consider the first case—where there are 4 distinct elements in this subset, the 4 distinct elements being $\{1, 2, 3, 4\}$. Now, let the frequencies of these elements be f1, f2, f3 and f4. That is, we are really considering a subset where there are f1 elements for which SizeModN(size)=1,
f2 elements for which SizeModN(size)=2,
f3 elements for which SizeModN(size)=3,
f4 elements for which SizeModN(size)=4

Hence, by equation (1) we have $$(f1 \cdot 1 + f2 \cdot 2 + f3 \cdot 3 + f4 \cdot 4) \bmod 8 = B, \text{ or}$$

$$f1 \cdot 1 + f2 \cdot 2 + f3 \cdot 3 + f4 \cdot 4 = 8Q + B,$$

where Q is some positive integer.
Let us assume without loss of generality that the smallest value among f1, f3 and f4 is f3. Note that in this example 1+3+4=8, so we are interested in finding the smallest frequencies among f1, f3 and f4. Then, we have $$f3 \cdot 1 + (f1 - f3) \cdot 1 + f2 \cdot 2 + f3 \cdot 3 + f3 \cdot 4 + (f4 - f3) \cdot 4 = 8Q + B,$$

rearranging $$f3 \cdot (1 + 3 + 4) + (f1 - f3) \cdot 1 + f2 \cdot 2 + (f4 - f3) \cdot 4 = 8Q + B, \text{ or}$$

$$(f1 - f3) \cdot 1 + f2 \cdot 2 + (f4 - f3) \cdot 4 = 8(Q - f3) + B$$

Thus, we can see that we have found a smaller sub-set which contains (f1−f3) elements where SizeModN(size)=1
f2 elements where SizeModN(size)=2
(f4−f3) elements where SizeModN(size)=4 ps This smaller sub-set can also satisfy the same equation. Thus, instead of requiring 4 distinct elements to satisfy this equation, we need only 3.

We can similarly show for the remaining 7 cases (where there is some combination of elements which add to 8 or 16), that we need only 3 distinct elements.

This completes the proof that N=8→D=3. Further, this proves that all possible solutions can be computed in polynomial time. There is an upper limit on the number of distinct elements, and there is an upper limit on the frequency for each distinct element. These values will be used to compute all the valid solutions.

Computation of Valid Solutions

The valid solutions can be computed by hand for N=2 and N=4 because the numbers are small. The valid solutions for N=8 can be computed programmatically.

Valid Solutions for N=2

When N=2, the only hole size that is possible is B=1. The only valid solution when N=2 and B=1 is <1,1>, which indicates that a hole one byte in size can be filled as long as there is one odd-sized data element.

Valid Solutions for N=4

When N=4, the hole size can be 1, 2 or 3.
When B=1, the following solutions are valid:

1. $\{<1,1>\}$
2. $\{<3,3>\}$
3. $\{<2,1>,<3,1>\}$

Solution <1,1> indicates that a valid solution for a hole size of 1 is one data element whose size modulo 4 is 1. Solution <3,3> indicates that a valid solution for a hole size of 1 is three data elements, each having a size modulo 4 of 3. Solution $\{<2,1>,<3,1>\}$ indicates that a valid solution for a hole size of 1 is one data element having a size modulo 4 of 2 and one data element having a size modulo 4 of 3.

When B=2, the following solutions are valid:

1. $\{<1,2>\}$
2. $\{<2,1>\}$
3. $\{<3,2>\}$

When B=3, the following solutions are valid:

1. $\{<1,3>\}$
2. $\{<3,1>\}$
3. $\{<1,1>,<2,1>\}$

Valid Solutions for N=8

When N=8, the hole size B can be any of {1, 2, 3, 4, 5, 6, 7}. A valid solution to equation (1) may include 1, 2, or 3 distinct data elements, since $D_8=3$, as shown above. A valid solution will consist only of combinations of selected data elements as defined below:

There are 7 ways of choosing 1 distinct element from 7 elements.

There are 21 ways of choosing 2 distinct data elements from 7 elements. The combinations 1 and 7, 2 and 6, 3 and 5 can be ignored.

There are 35 ways of choosing 3 distinct elements from 7 elements, out of which only 16 need to be considered. Five subsets that contain both 1 and 7, five subsets that contain both 2 and 6, five subsets that contain both 3 and 5, and the subsets {1,2,5}, {1,3,4}, {7,6,3} and {7,5,4} need not be considered, since they can be replaced with equivalent sets that contain only 2 distinct elements.

A listing of an example of program code to calculate the valid solutions when N=8 is shown below:

```c
/* max freq of i where 1 <= i <= 7 */
int maxfreq[8] = { 0, 7, 3, 7, 1, 7, 3, 7 };
int howmany[8] [4];
int MaxSum;
typedef struct _freqcount {
    unsigned short sizemod8;
    unsigned short freq;
} freqcount;
typedef struct _freqcountentry {
    unsigned short count;
    freqcount       freqlist[3];
} freqcountentry;
typedef struct _freqcountlist {
    unsigned short count;
    freqcountentry entry[150];
} freqcountlist;
freqcountlist sizemod8[8];
int ones, twos, threes;
int foo(int i, int j, int k)
{
    int   l, m, n;
    int   summod8;
    int   p, q, r;
    int   t;
    int   done;
#if 0
printf("****************************************************************
***************\n");
    printf("\ti\tfreq(i)\tj\tfreq(j)\tk\tfreq(k)\tsum mod 8\n");
printf("****************************************************************
***************\n");
#endif
    for (l = 1; l <= maxfreq[i]; l++)
        for ( m = 1; m <= maxfreq[j]; m++ )
            for ( n = 1; n <= maxfreq[k]; n++ )
                {
                    summod8 = ( i * l + j * m + k * n ) & 7;
/* Ignore if summod8 == 0 */
                    if ( summod8 == 0 )
                        continue;
/* Ignore cases where summod8 can be obtained with a combination
            of (i, j, k ) where the frequencies of i, j and k are less
            than l, m and n.
*/
                    for(p = 0; p <= l ; p++)
                        for(q = 0; q <= m ; q++)
                            for(r = 0; r <= n ; r++)
                                {
                                    if ( ((i * p + j * q + k * r) & 7) == summod8 )
                                        goto foolabel;
                                }
foolabel:
                    if ( ! ( p == l && q == m && r == n ))
                        continue;
#if 0
printf("\t%d\t%d\t%d\t%d\t%d\t%d\t%d\n",i,l,j,m,k,n,summod8);
#endif
                    howmany[summod8][3]++;
                    threes++;
                    if ( MaxSum < (i*l + j*m + k*n) )
                        MaxSum = i*l + j*m + k*n;
                    t = sizemod8[summod8].count;
                    sizemod8[summod8].count++;
```

```
                        sizemod8[summod8].entry[t].count = 3;
                        sizemod8[summod8].entry[t].freqlist[0].sizemod8 = i;
                        sizemod8[summod8].entry[t].freqlist[0].freq = l;
                        sizemod8[summod8].entry[t].freqlist[1].sizemod8 = j;
                        sizemod8[summod8].entry[t].freqlist[1].freq = m;
                        sizemod8[summod8].entry[t].freqlist[2].sizemod8 = k;
                        sizemod8[summod8].entry[t].freqlist[2].freq = n;
                }
        }
}
bar(int i, int j)
{
        int     l, m, n;
        int     summod8;
        int     p, q;
        int     t;
        int     done;
#if 0
printf("************************************************************************
**************\n");
        printf("\ti\tfreq(i)\tj\tfreq(j)\tsum mod 8\n");
printf("************************************************************************
**************\n");
#endif
        for (l = 1; l <= maxfreq[i]; l++)
                for ( m = 1; m <= maxfreq[j]; m++ )
                        {
                        summod8 = ( i * l + j * m ) & 7;
/* Ignore if summod8 == 0 */
                        if ( summod8 == 0 )
                                continue;
                        for(p = 0; p <= l ; p++)
                            for(q = 0; q <= m ; q++)
                                {
                                if ( ((i * p + j * q ) & 7) == summod8 )
                                    goto barlabel;
                                }
barlabel:
                        if (!( p == l && q == m ))
                                continue;
#if 0
                        printf("\t%d\t%d\t%d\t%d\t%d\n",i,l,j,m,summod8);
#endif
                        twos++;
                            if ( MaxSum < ( i*l + j*m ) )
                                MaxSum = i*l + j*m;
                            howmany[summod8][2]++;
                            t = sizemod8[summod8].count;
                            sizemod8[summod8].count++;
                            sizemod8[summod8].entry[t].count = 2;
                            sizemod8[summod8].entry[t].freqlist[0].sizemod8 = i;
                            sizemod8[summod8].entry[t].freqlist[0].freq = l;
                            sizemod8[summod8].entry[t].freqlist[1].sizemod8 = j;
                            sizemod8[summod8].entry[t].freqlist[1].freq = m;
                        }
}
sim(int i)
{
        int     l, m, n;
        int     summod8;
        int     t;
#if 0
printf("************************************************************************
**************\n");
        printf("\ti\tfreq(i)\tsum mod 8\n");
printf("************************************************************************
**************\n");
#endif
        for (l = 1; l <= maxfreq[i]; l++)
                {
                summod8 = ( i * l ) & 7;
/* Ignore if summod8 == 0 */
                if (summod8 == 0)
                        continue;
#if 0
                printf("\t%d\t%d\t%d\n",i,l,summod8);
#endif
                ones++;
                if ( MaxSum < i*l )
                    MaxSum = i*l;
```

-continued

```
                howmany[summod8][1]++;
                t = sizemod8[summod8].count;
                sizemod8[summod8].count++;
                sizemod8[summod8].entry[t].count = 1;
                sizemod8[summod8].entry[t].freqlist[0].sizemod8 = i;
                sizemod8[summod8].entry[t].freqlist[0].freq = 1;
            }
    }
}
main()
{
    int i,j,k;
/* All the cases where 3 distinct numbers are chosen from 1 . . . 7
*/
    foo(1,2,3);
    foo(1,2,4);
    foo(1,3,6);
    foo(1,4,5);
    foo(1,4,6);
    foo(1,5,6);
    foo(2,3,4);
    foo(2,3,7);
    foo(2,4,5);
    foo(2,4,7);
    foo(2,5,7);
    foo(3,4,6);
    foo(3,4,7);
    foo(4,5,6);
    foo(4,6,7);
    foo(5,6,7);
/* All the cases where 2 distinct numbers are chosen from 1 . . . 7
*/
    bar(1,2);
    bar(1,3);
    bar(1,4);
    bar(1,5);
    bar(1,6);
    bar(2,3);
    bar(2,4);
    bar(2,5);
    bar(2,7);
    bar(3,4);
    bar(3,6);
    bar(3,7);
    bar(4,5);
    bar(4,6);
    bar(4,7);
    bar(5,6);
    bar(5,7);
    bar(6,7);
    sim(1);
    sim(2);
    sim(3);
    sim(4);
    sim(5);
    sim(6);
    sim(7);
    printf("Number of ones = %d\n", ones);
    printf("Number of twos = %d\n", twos);
    printf("Number of threes = %d\n", threes);
    printf("MaxSum = %d\n", MaxSum);
    printf("\tMod 8\tS(1)\tS(2)\tS(3)\tTotal\n");
    for( i = 1; i <= 7; i++)
        {
            int sum = howmany[i][1] + howmany[i][2] + howmany[i][3];
            printf("\t%d\t%d\t%d\t%d\t%d\n", i, howmany[i][1],
                        howmany[i][2], howmany[i][3], sum );
        }
    for(i = 1; i <= 7; i++)
        {
printf("*****************************************************************
*\n");
            printf("Number of entries for %d=\t%d\n",i,
                        sizemod8[i].count);
printf("*****************************************************************
*\n");
            for(j = 0; j < sizemod8[i].count; j++)
                {
                    freqcount *freqp;
                    k = sizemod8[i].entry[j].count;
```

-continued

```
        freqp = sizemod8[i].entry[j].freqlist;
        if ( k == 1)
            printf("\t%d\t%d\n",freqp[0].sizemod8, freqp[0].freq);
        else if (k == 2)
            printf("\t%d\t%d\t%d\t%d\n",freqp[0].sizemod8,
                    freqp[0].freq, freqp[1].sizemod8,
                    freqp[1].freq);
        else if (k == 3)
            printf("\t%d\t%d\t%d\t%d\t%d\t%d\n",freqp[0].sizemod8,
                    freqp[0].freq, freqp[1].sizemod8,
                    freqp[1].freq, freqp[2].sizemod8,
                    freqp[2].freq);
        }
    }
}
```

Figure 6:
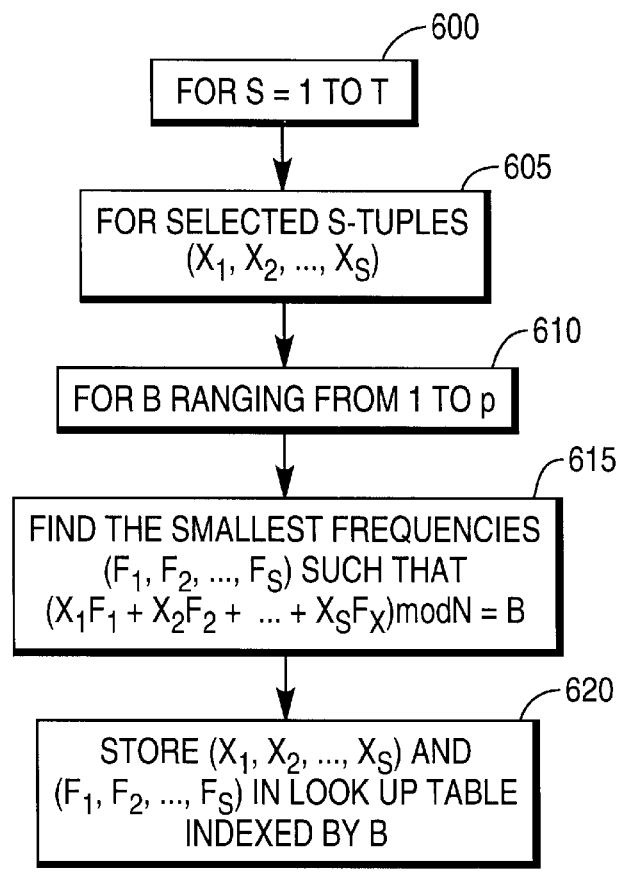
FIG. 6 is a flow chart of a process for creating a look up table useful for allocating storage for aligned data.

The above example program determines the valid solutions by performing the following processing, as shown in FIG. 6, for s from 1 to t (block 600):

for selected s-tuples ($x_1, x_2, \ldots x_s$) (block 605) and for B ranging from 1 to p (block 610) find the smallest frequencies ($f_1, f_2, \ldots f_s$) such that $$(x_1 \cdot f_1 + x_2 \cdot f_2 + \ldots + x_s \cdot f_s) \bmod N = B \text{ (block 615)},$$

where N is the largest alignment requirement associated with a data element, t is an upper limit on the number of distinct elements in a valid solution, as discussed above, and p is N−1. The s-tuples and frequencies are then stored in the look up table indexed by B (block 620). In the above example program, t=3 and p=7.

The s-tuples are selected such the sums of two or more elements of the selected s-tuples do not equal $2^r$ or a multiple of $2^r$. In the example program above, for which t is 3, the s-tuples are selected such that the sum of two or more elements of the selected s-tuples do not equal 8 or a multiple of 8.

In the above example program, the selected s-tuples include: (1,2,3), (1,2,4), (1,3,6), (1,4,5), (1,4,6), (1,5,6), (2,3,4), (2,3,7), (2,4,5), (2,4,7), (2,5,7), (3,4,6), (3,4,7), (4,5,6), (4,6,7), and (5,6,7).

In the above example program, the selected 2-tuples include: (1,2), (1,3), (1,4), (1,5), (1,6), (2,3), (2,4), (2,5), (2,7), (3,4), (3,6), (3,7), (4,5), (4,6), (4,7), (5,6), (5,7), and (6,7).

In the above example program, the selected 1-tuples include: 1, 2, 3, 4, 5, 6, and 7.

Figure 7:
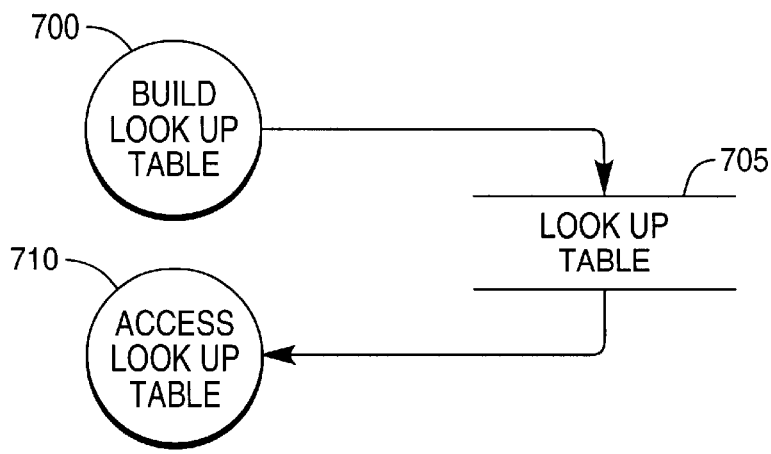
FIG. 7 is a data flow diagram illustrating the creation and use of a look up table useful for allocating storage for aligned data.
Figure 8:
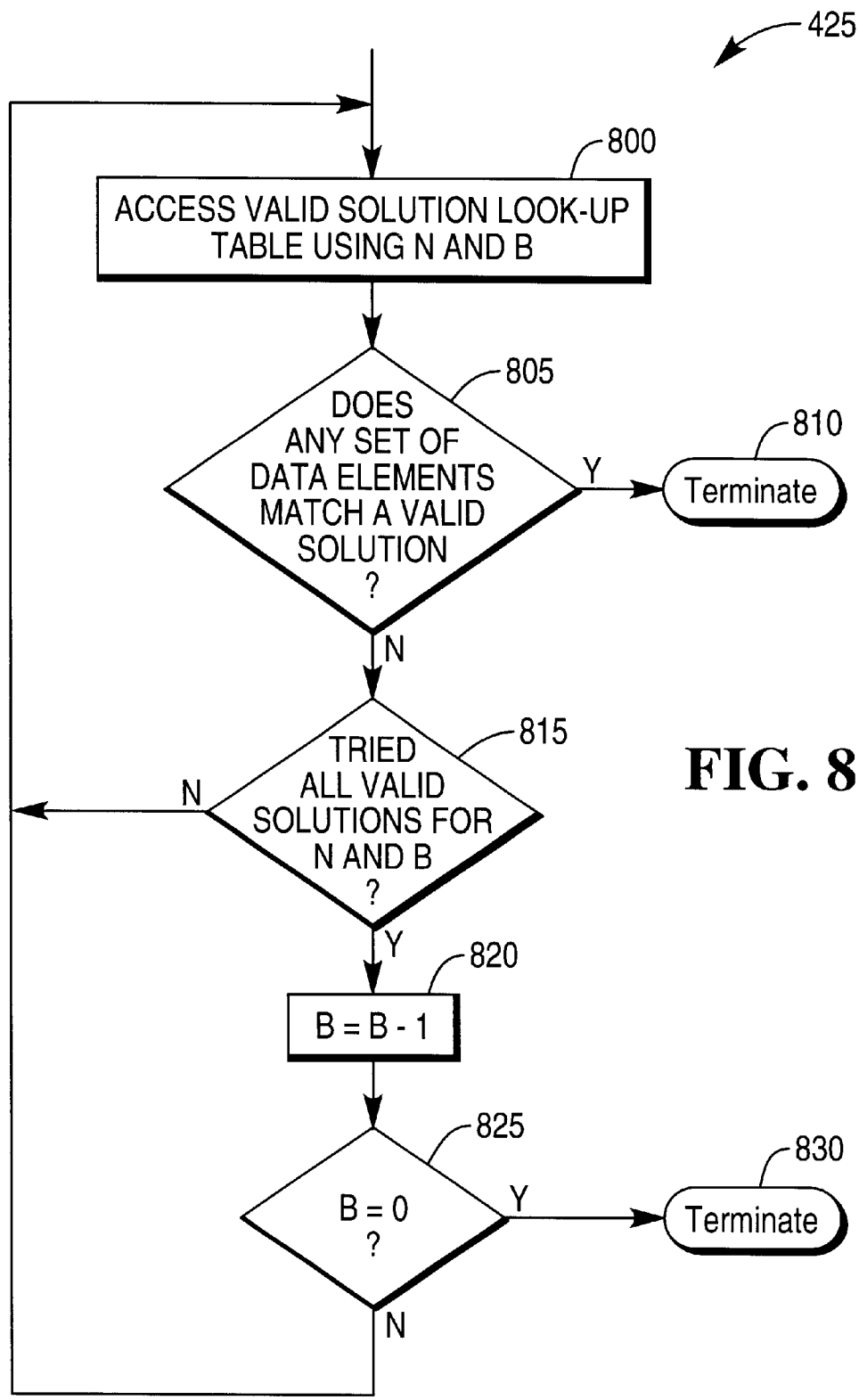
FIG. 8 is a flow chart of a process for accessing of a look up table useful for allocating storage for aligned data.

After the above program runs, the s-tuples and respective frequencies are stored (block 700) in a look up table 705, as shown in FIG. 7. When it is time to allocate storage for a header and data elements, the look up table 705 is accessed (block 710).

The data structure for the N=8 portion of the look up table 805, called freqcountlist in the program listing above, is repeated below for discussion purposes:

```
typedef struct _freqcount {
    unsigned short sizemod8;
    unsigned short freq;
} freqcount;
typedef struct _freqcountentry {
    unsigned short count;
    freqcount    freqlist[3];
} freqcountentry;
```

```
typedef struct _freqcountlist {
    unsigned short count;
    freqcountentry entry[22];
} freqcountlist;
```

The "freqcount" data structure contains a data element modulus object $D_n$ (sizemod8), which contains sizemodN ($D_n$) where N is the largest alignment requirement associated with any data element, and a frequency object $F_n$ (freq), which contains the number of respective data elements $D_n$ required to be included in a valid solution to equation (1). In the example shown above N=8. For example, if a valid solution requires 3 data elements whose length modulo 8 is 1, then freq=3 and sizemod8 =1 for that entry in the table.

The "freqcountentry" data structure contains the number of distinct data elements (count) and the type and frequency of each distinct data element (freqlist) to solve equation (1). For example, if a valid solution requires 2 data elements whose length modulo 8 is 1, 1 data element whose length modulo 8 is 2, and 1 data element whose length modulo 8 is 3, a freqcountentry data element for that valid solution would contain the following:

| | |
|---|---|
| count = 3 | indicates "how many" distinct elements |
| freqlist[0].sizemod8 = 1 | indicates sizemod8 of first distinct element |
| freqlist[0].freq = 2 | indicates frequency of first distinct element |
| freqlist[1].sizemod8 = 2 | indicates value of second distinct element |
| freqlist[1].freq = 1 | indicates frequency of second distinct element |
| freqlist[2].sizemod8 = 3 | indicates sizemod8 of third distinct element |
| freqlist[2].freq = 1 | indicates frequency of third distinct element |

The "freqcountlist" data structure contains a hole size data object, which is all of the valid solutions for N=8 and a particular hole size B. The freqcountlist data structure has 22 entries because the maximum number of solutions for any hole size is 22, as shown in Table 3 below, which is one of the byproducts of the program code shown above:

TABLE 3

| | Number of Valid Solutions | | |
|---|---|---|---|
| Hole Size | N = 2 | N = 4 | N = 8 |
| 1 | 1 | 3 | 22 |
| 2 | | 3 | 20 |
| 3 | | 3 | 22 |

TABLE 3-continued

| | Number of Valid Solutions | | |
|---|---|---|---|
| Hole Size | N = 2 | N = 4 | N = 8 |
| 4 | | | 17 |
| 5 | | | 22 |
| 6 | | | 20 |
| 7 | | | 22 |

The sizemod8[8] array, which is an alignment data object, contains all of the solutions for N=8 and all hole sizes B from 1 to 7.

A similar data structure for N=4 is shown below:

```
typedef struct _freqcount {
    unsigned short sizemod4;
    unsigned short freq;
} freqcount;
typedef struct _freqcountentry {
    unsigned short count;
    freqcount      freqlist[2];
} freqcountentry;
typedef struct _freqcountlist {
    unsigned short count;
    freqcountentry entry[3];
} freqcountlist;
freqcountlist sizemod4[3];
```

Note that freqcount has been limited to 2 freqlist elements because the valid solutions for N=4 never include data elements having more than two sizemod4 values. The freqcountentry has been limited to 3 entry elements because there are never more than 3 valid solutions for a particular hole size, as shown in the table above. Finally, the sizemod4 array has been limited to 3 entries because there are only 3 relevant hole sizes, as shown in the table above.

The data stored in these data structures, plus a single entry for N=1, form a lookup table which can be used to allocate storage for aligned data. The lookup table is indexed using N and B.

A program would allocate storage space to a header and a set of data elements by accessing the lookup table using N and B, which were calculated earlier, as indexes to retrieve a first set of one or more modulo values $M_{1,1 \ldots R}$ and a frequency $F_{1,1 \ldots R}$ for each modulo value (block 800). The program would then search for a subset $T=\{A_{i1}, A_{i2}, \ldots, A_{in}\}$ of data elements from those retrieved such that for every p from 1 to R there is a set of $F_{1,p}$ data elements such that the size of those data elements modulo N is $M_{1,p}$ (block 805). If such a subset is found, the subset is the valid solution for the allocation problem and the processing is completed (block 810).

If, on the other hand, the search for a subset T fails using the first set of one or more modulo values $M_{1,1 \ldots R}$ and the frequency $F_{1,1 \ldots R}$ for each modulo value, the program would access the lookup table again using N and B as indexes to retrieve a second set of one or more modulo values $M_{2,1 \ldots R}$ and a frequency $F_{2,1 \ldots R}$ for each modulo value (blocks 815 and 800). The program would then search for subset T using $M_{2,1 \ldots R}$ and frequency $F_{2,1 \ldots R}$ (block 805). This cycle would repeat until all of the valid solutions for the calculated N and B have been exhausted.

If the search for subset T of data elements fails using the calculated N and B, the program continues by setting B=B−1 (block 820). If B=0 (block 825), the program will stop looking for valid solutions (block 830). Otherwise, the search will continue (block 800).

This method will ensure that the total storage allocated for the header and the data elements is optimal. The total size allocated using the very simple approach is H+B+FL, where H is the size of the header, B is the size of the hole and FL is the total size of all the data elements.

Let FL=Q*N+R, where Q is a positive number and R is equal to FL modulo N.

There is at least one subset of data elements whose sum of the SizeModN function will be equal to R. The above algorithm will identify this sub-set and will move the data elements appropriately, if R≦B.

If R>B, then the algorithm will try to identify another sub-set (if one exists) such that sum of SizeModN function will yield B, B−1, B−2 and so on. All possible valid solutions have been pre-computed and stored in the look up table. So, this method will find an optimal solution.

The following is an additional application of the above result:

Consider an example where the header, and TYPE1 data elements are followed by TYPE2 data elements. The TYPE2 data elements may have an alignment requirement of 8, 4, 2 or 1. There is an additional constraint that all the TYPE2 data elements must be stored according to decreasing order of alignment requirement. So data elements that need an alignment of 8 will precede data elements that need an alignment of 4, which in turn will precede data elements that need an alignment of 2 and 1.

In this case, it is possible to compute the size of a hole C, which will immediately follow the last TYPE1 data element and precede the first TYPE2 data element. Let the maximum alignment of a TYPE2 data element be CA. The length of C will depend on CA, and may be as high as (CA−1). The value of B depends on N, and may be as high as (N−1), prior to the application of the storage allocation method for TYPE1 data elements. Hence, the combined hole size (B+C) will be (N−1)+(CA−1). Since the maximum values of N and CA may be 8, the combined hole size may be as high as 14.

After application of the storage allocation method described here for TYPE1 data elements, the combined hole size (B+C) will be limited by Maximum(N−1, CA−1). Thus, the combined hole size will reduce from 14 to 7 in the worst case.

The proof for this will be in 3 cases: (a) N=CA (b) N>CA and (c) N<CA

Let the total size of TYPE1 data elements be FL=QN+R, Q>0 and R=FL modulo N.

Let the start of TYPE1 and TYPE2 data elements be FS and CS respectively. In all cases, the value of (B+C) will be reduced by CA after applying the storage allocation method for storing TYPE1 data elements.

Proof for case (a): N=CA

CS=FS+FL+C, implies C=(CA−R), since CS is computed by finding the nearest multiple of (FS+FL) with respect to CA, and CS=N.

Suppose B+C>N, then, B+(CA−R)>CA (since C=(CA−R) and N=CA)

or, B−R>0, or R<B

The storage allocation algorithm will find a subset whose sum of SizeModN will be R, which exists since the total length of TYPE1 data elements is FL=QN+R. Since R is less than B, this subset will be moved to the space earlier allocated to the hole B. Hence, the new value of B will be equal to (B−R), and the new value of C will become 0. The new value of (B+C) has reduced by CA.

Proof for case b: N>CA

There are 3 sub-cases to consider: In each case, it will be observed that the value of B will exceed the value of R=FL modulo N. Hence, the above method will move these data elements and reduce B by R. The value of C will become 0. The value of (B+C) will be reduced by at least CA.

(N=4, CA=2): The values of B, C for which the sum will greater than or equal to N are:

(B,C)=(3,1): FL will be either 4Q+1 or 4Q+3.

(N=8, CA=2): The values of B, C for which the sum will greater than or equal to N are:

(B,C)=(7,1). FL will be either 8Q+1, 8Q+3, 8Q+5 or 8Q+7.

(N=8, CA=4): The (B,C) values for which B+C will be greater than or equal to N are:
  (B,C)=(7,1): FL=8l+3, or 8l+7.
  (B,C)=(6,2): FL=8l+2, or 8l+6.
  (B,C)=(7,2): FL=8l+2, or 8l+6.
  (B,C)=(5,3): FL=8l+1, or 8l+5.
  (B,C)=(6,3): FL=8l+1, or 8l+5.
  (B,C)=(7,3): FL=8l+1, or 8l+5.

Proof for case c: N<CA

There are 3 sub-cases to consider: (N=2, CA=8), (N=4, CA=8) and (N=2, CA=4)

There are 3 cases where N<CA. For each case, the combinations of (B,C) are shown below for which B+C will be greater than or equal to Maximum(N,CA)=CA. In each case it will be observed that B>=FL mod FA. Hence the above method will be able to move the subset of data elements into the hole B, so that the value of B will reduce to (B–R).

Assume k and l are positive integers below. Let FS indicate the start of the TYPE1 data elements, and FL the total size of TYPE1 data elements.

N=2, CA=4. (B, C) combinations are (1, 3).
  (B,C)=(1, 3): Then FS=4k and FL=4l+1, or FS=4k+2 and FL=4l+3

N=2, CA=8. (B, C) combinations are (1, 7).
  (B,C)=(1, 7): Then FS=8k and FL=8l+1, or FS=8k+2 and FL=8l+7, or FS=8k+4 and FL=8l+5, or FS=8k+6 and FL=8l+3.

FA=4, CA=8. (B, C) combinations are (1, 7), (2, 6), (2, 7), (3, 5), (3, 6), (3, 7).
  (B,C)=(1, 7): Then FS=8k and FL=8l+1, or FS=8k+4 and FL=8l+5.
  (B,C)=(2, 6): Then FS=8k and FL=8l+2, or FS=8k+4 and FL=8l+6.
  (B,C)=(2 ,7): Then FS=8k and FL=8l+1, or FS=8k+4 and FL=8l+5.
  (B,C)=(3, 5): Then FS=8k and FL=8l+3, or FS=8k+4 and FL=8l+7.
  (B,C)=(3, 6): Then FS=8k and FL=8l+2, or FS=8k+4 and FL=8l+6.
  (B,C)=(3, 7): Then FS=8k and FL=8l+1, or FS=8k+4 and FL=8l+5.

There is another application of the storage allocation method described here. Originally, it was assumed that TYPE1 data elements have a size that is a multiple of their alignment requirement. Consider an application where this assumption is relaxed. For example, a data element may require alignment of 4, but it may require only 10 bytes of storage. In this case, the simple method of storage allocation (where data elements are stored in descending order of alignment requirement) will create multiple holes, in addition to the hole B. Basically, a hole will be created with each data element whose size is not a multiple of the alignment requirement.

The method of storage allocation described here can be applied in an iterative manner to fill up the hole B, and also the other holes associated with a data element whose size is not a multiple of its alignment. This method may be applied to the largest holes first and then to the smaller ones.

The storage allocation method has been described where the maximum alignment of a data element is 8. It is possible to generalize this method where the maximum alignment of a data element (N) is higher, say 16 or 32. This will require the following steps: Let $S_N$ be the set $\{1, 2, 3, \ldots, (N-2), (N-1)\}$ Determine an upper limit on the maximum frequency for each element in $S_N$. This can be done using the method described earlier ("Upper Limit on Number of Data Elements").

Determine an upper limit on the number of distinct elements from $S_N$ that need to be considered in any solution set. Let this upper limit be denoted by "n".

Compute the set of valid solutions using a program. The methodology for this program will be similar to the one used to compute valid solutions for N=8.

The following is a brief description on computing an upper limit on the number of distinct elements for larger N (N>8).

Let f(N) denote the upper limit on the number of distinct elements for N. Suppose we want to find if K distinct elements can be present in a subset of $S_N$. This will involve the computation done below by CheckDistinct(N, K). It will basically check whether K distinct elements are permitted and return true or false accordingly.

```
CheckDistinct(N, K)
begin
    do /* For each subset S_K = { a_1, a_2, ... a_K } containing K elements from S_N */
        do /* For each non-empty subset S_L of S_K ( 1 <= L <= K ) where SL = {
            b_1, ... b_L } */
            Found = false
            SumModN = (b1 + b2 + ... + bL) mod N
            if (SumModN == 0)
                Found = true
        done /* For each non-empty subset S_L of S_K ( 1 <= L <= K ) *
        if ( found == false )
            return true /* There is 1 subset with K distinct elements such that
                the sum of 2 or more elements does not add up to N or a
                multiple of N */
```

-continued

```
done  /* For each subset S_K = { a_1, a_2, ... a_K } containing K elements from S_N */
return false; /* Every subset with K distinct elements can be reduced to one with
        fewer distinct elements, since the sum of 2 or more elements adds
        to N or a multiple of N */
end /* CheckDistinct */
```

Thus, f(N)=n, where CheckDistinct(N, n) returns true and CheckDistinct(N, n+1) returns false.

Intuitively, and on the basis of the results found for most small values of N, f(N) will satisfy the following relation:

$$f(N)=\max K \text{ where } K*(K+1)/2-1<=N$$

Example: N=9. Here $S_N=\{1, 2, 3, 4, 5, 6, 7, 8\}$

It is easy to see that any subset may contain 1 or 8, but not both. Similarly it may contain 2 or 7, but not both, 3 or 6 but not both and 4 or 5 but not both. Hence, the maximum number of distinct elements will not exceed 4.

Two sub-sets with 4 distinct elements are $\{1, 3, 4, 7\}$ and $\{8, 6, 5, 2\}$. Here K=4 and it satisfies the condition that $K*(K+1)/2-1<=N$.

This equation for f(N) provides useful information for small values of N ($6<=N<=20$). It is believed that the equation will also provide useful information for some larger values of N.

The various implementations of the invention are realized in electronic hardware, computer software, or combinations of these technologies. Most implementations include one or more computer programs executed by a programmable computer. In general, the computer includes one or more processors, one or more data-storage components (e.g. volatile and nonvolatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copies into memory at run-time. The processor executes the code by retrieving program instructions from memory in a prescribed order. When executing the program code, the computer receives data from the input and/or storage devices, performs operations on the data, and then delivers the resulting data to the output and/or storage devices.

The text above described one or more specific embodiments of a broader invention. The invention also is carried out in a variety of alternative embodiments and thus is not limited to those described here. For example, while the invention has been described in relation to a system employing a 64 bit processor, systems using other types of processors would benefit from the invention. Many other embodiments are also within the scope of the following claims.

What is claimed is:

1. A method for allocating storage for a header and one or more data elements in a data storage facility where:
   the data storage facility is divided into words,
   each word includes one or more incidents of one or more types of alignment boundaries,
   each incident of a type of alignment boundary falls on a multiple of a base amount of units from the beginning of the word, the base amount being unique for each type of alignment boundary,
   each data element is required to satisfy an alignment requirement, which is the size of alignment boundary with which it is required to align,
   each data element has a length that is a multiple of its alignment requirement; and
   the method comprises
      computing a hole size, B, that is a portion of a word that would be unallocated if storage were allocated to the header and to the data elements in a preferred order;
      finding a subset of data elements $S=\{F_{i1}, F_{i2}, \ldots, F_{in}\}$ that satisfy the following equation:

$$(\text{SizeMod}N(F_{i1})+\text{SizeMod}N(F_{i2})+ \ldots +\text{SizeMod}N(F_{in}))\bmod N=B$$

where SizeModN(F) is the size of F modulo N, and N is the largest alignment requirement associated with any data element;
      allocating storage to data elements in S first; and
      allocating storage to the remaining data elements in the preferred order.

2. The method of claim 1 wherein finding the subset of data elements S comprises
   accessing a lookup table using N and B as indexes to retrieve a first set of one or more modulo values $M_{1,1 \ldots R}$ and a frequency $F_{1,1 \ldots R}$ for each modulo value; and
   searching for a subset $T=\{A_{i1}, A_{i2}, \ldots, A_{in}\}$ of data elements such that for every p from 1 to R there is a set of $F_{1,p}$ data elements such that the size of those data elements modulo N is $M_{1,p}$; and
   setting S=T.

3. The method of claim 2 wherein finding the subset of data elements S further comprises
   if the search for a subset T of data elements fails using the first set of one or more modulo values $M_{1,1 \ldots R}$ and the frequency $F_{1,1 \ldots R}$ for each modulo value, accessing the lookup table again using N and B as indexes to retrieve a second set of one or more modulo values $M_{2,1 \ldots R}$ and a frequency $F_{2,1 \ldots R}$ for each modulo value; and
   searching for subset T using $M_{2,1 \ldots R}$ and a frequency $F_{2,1 \ldots R}$; and
   setting S=T.

4. The method of claim 3 wherein finding the subset of data elements S further comprises
   if the search for a subset T of data elements fails setting B=B−1 and repeating the search.

5. A lookup table useful in allocating storage for a header and one or more data elements in a data storage facility where:
   the data storage facility is divided into words,
   each word includes one or more incidents of one or more types of alignment boundaries,
   each incident of a type of alignment boundary falls on a multiple of a base amount of units from the beginning of the word, the base amount being unique for each type of alignment boundary,
   each data element is required to satisfy an alignment requirement, which is the size of alignment boundary with which it is required to align,
   each data element has a length that is a multiple of its alignment requirement; and the lookup table comprises
  a plurality of solution data objects, each of which includes
    one or more data element modulus objects $D_{1 \ldots n}$, each data item modulus object containing a data item size modulo the largest alignment requirement associated with any data element; and
    a frequency object $F_{1 \ldots n}$ for each respective data item modulus object, each frequency object containing the number of respective data elements required, in combination with the other data elements identified by the data element modulus objects to satisfy the following equation:

$$(F_1 \cdot D_1 + F_2 \cdot D_2 + \ldots + F_n \cdot D_n) \bmod N = B$$

where B is the size of a portion of a word that would be unallocated if storage were allocated to the header and to the data elements in a preferred order, and N is the largest alignment requirement associated with a data element.

6. The lookup table of claim 5 wherein each solution data object includes
  a count data object that contains the number of data element modulus objects in the respective solution data object.

7. The lookup table of claim 5 wherein
  the solution data objects are grouped into hole size data objects, where each hole size object is associated with a selected value of B.

8. The lookup table of claim 7 wherein
  the hole size objects are grouped into alignment data objects, where each alignment object is associated with a selected largest alignment requirement.

9. A method for building a lookup table for allocating storage for a header and one or more data elements in a data storage facility where:
  the data storage facility is divided into words,
  each word includes one or more incidents of one or more types of alignment boundaries,
  each incident of a type of alignment boundary falls on a multiple of a base amount of units from the beginning of the word, the base amount being unique for each type of alignment boundary,
  each data element is required to satisfy an alignment requirement, which is the size of alignment boundary with which it is required to align,
  each data element has a length that is a multiple of its alignment requirement; and
  where the method comprises
    for s from 1 to t, performing the following
      for selected s-tuples $(x_1, x_2, \ldots x_s)$ and for B ranging from 1 to p find the smallest frequencies $(f_1, f_2, \ldots f_s)$ such that $$(x_1 \cdot f_1 + x_2 \cdot f_2 + \ldots + x_s \cdot f_s) \bmod N = B.$$

where N is the largest alignment requirement associated with a data element, t is an upper limit on the number of distinct elements in a valid solution, and p is N−1.

10. The method of claim 9 where t is 3 and p is 7.

11. The method of claim 9 further comprising
storing the s-tuples and respective frequencies in the lookup table indexed by B.

12. The method of claim 9 where
the sum of two or more elements of each selected s-tuple does not equal $2^t$ or a multiple of $2^t$.

13. The method of claim 9 where
the selected 3-tuples when t is 3 include: (1,2,3), (1,2,4), (1,3,6), (1,4,5), (1,4,6), (1,5,6), (2,3,4), (2,3,7), (2,4,5), (2,4,7), (2,5,7), (3,4,6), (3,4,7), (4,5,6), (4,6,7), and (5,6,7).

14. The method of claim 9 where
the selected 2-tuples when t is 3 include: (1,2), (1,3), (1,4), (1,5), (1,6), (2,3), (2,4) (2,5), (2,7), (3,4), (3,6), (3,7), (4,5), (4,6), (4,7), (5,6), (5,7), and (6,7).

15. The method of claim 9 where
the selected 1-tuples when t is 3 include: 1, 2, 3, 4, 5, 6, and 7.

16. A computer program, stored on a tangible storage medium, for use in allocating storage for a header and one or more data elements in a data storage facility where:
  the data storage facility is divided into words,
  each word includes one or more incidents of one or more types of alignment boundaries,
  each incident of a type of alignment boundary falls on a multiple of a base amount of units from the beginning of the word, the base amount being unique for each type of alignment boundary,
  each data element is required to satisfy an alignment requirement, which is the size of alignment boundary with which it is required to align,
  each data element has a length that is a multiple of its alignment requirement; and
  the program comprises executable instructions that cause a computer to:
    compute a hole size, B, that is a portion of a word that would be unallocated if storage were allocated to the header and to the data elements in a preferred order;
    find a subset of data elements $S = \{F_{i1}, F_{i2}, \ldots, F_{in}\}$ that satisfy the following equation:

$$(\text{SizeModN}(F_{i1}) + \text{SizeModN}(F_{i2}) + \ldots + \text{SizeModN}(F_{in})) \bmod N = B$$

where SizeModN(F) is the size of F modulo N, and N is the largest alignment requirement associated with a data element;
    allocate storage to data elements in S first; and
    allocate storage to the remaining data elements in the preferred order.

17. The program of claim 16 where, in finding the subset of data elements S, the computer
  accesses a lookup table using N and B as indexes to retrieve a first set of one or more modulo values $M_{1,1 \ldots R}$ and a frequency $F_{1,1 \ldots R}$ for each modulo value; and
  searches for a subset $T = \{A_{i1}, A_{i2}, \ldots, A_{in}\}$ of data elements such that for every p from 1 to R there is a set of $F_{1,p}$ data elements such that the size of those data elements modulo N is $M_{1,p}$; and
  sets S=T.

18. The program of claim 16 where, in finding the subset of data elements S,
  if the search for a subset T of data elements fails using the first set of one or more modulo values $M_{1,1 \ldots R}$ and the frequency $F_{1,1 \ldots R}$ for each modulo value, the computer
  accesses the lookup table again using N and B as indexes to retrieve a second set of one or more modulo values $M_{2,1 \ldots R}$ and a frequency $F_{2,1 \ldots R}$ for each modulo value; and
  searches for subset T using $M_{2,1 \ldots R}$ and a frequency $F_{2,1 \ldots R}$; and
  sets S=T.

19. The program of claim 18 where, in finding the subset of data elements S,
  if the search for a subset T of data elements fails, the computer sets B=B−1 and repeats the search.

* * * * *